July 16, 1946.　　　　J. W. KING ET AL　　　　2,404,180
BURR REMOVING APPARATUS
Filed May 11, 1943　　　5 Sheets-Sheet 3
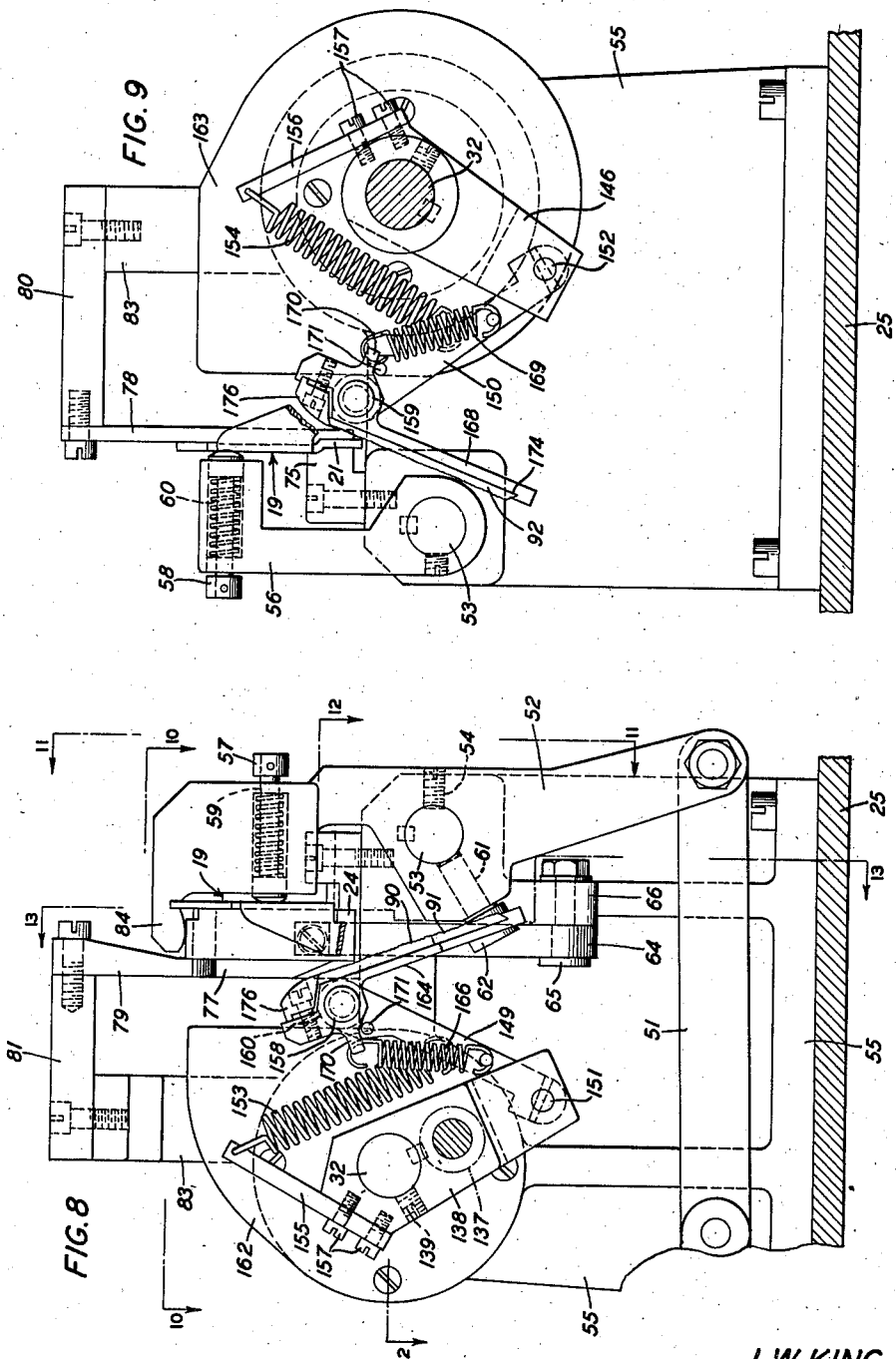
INVENTORS: J. W. KING
G. STUHLFAUTH
BY
ATTORNEY INVENTORS
J. W. KING
G. STUHLFAUTH
BY Harry L. Duft
ATTORNEY

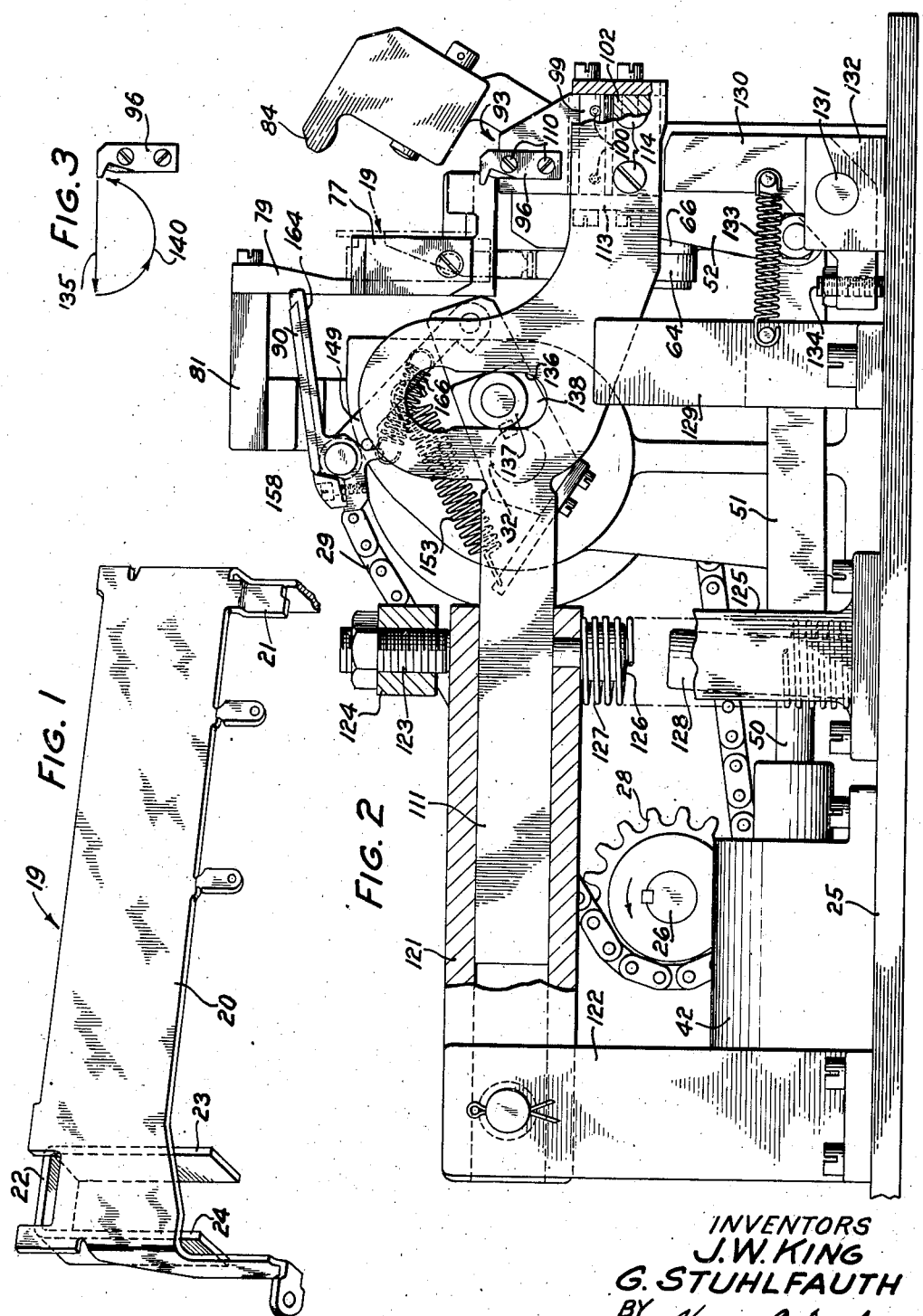

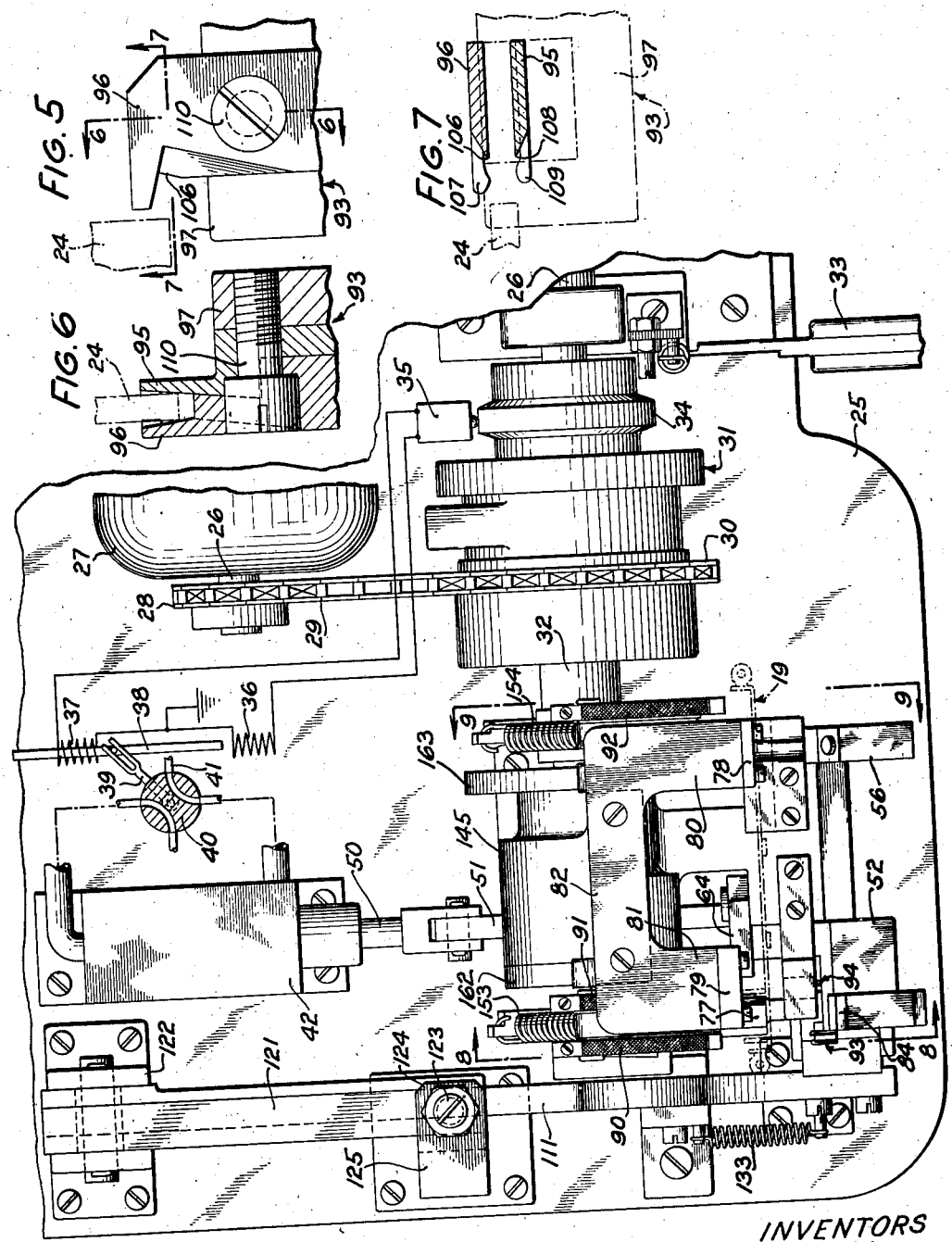

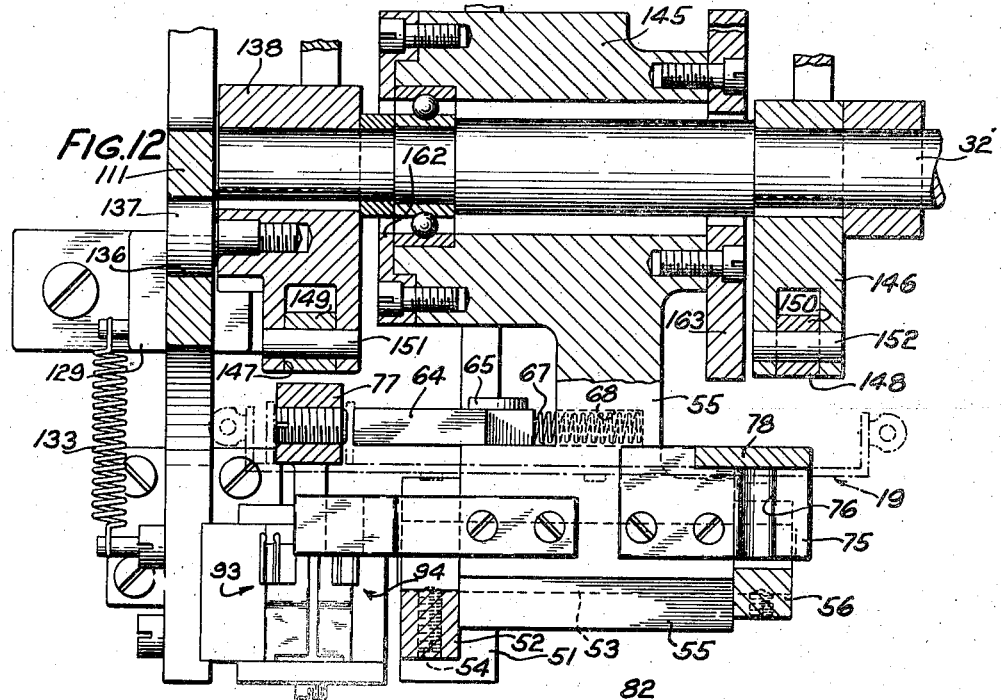
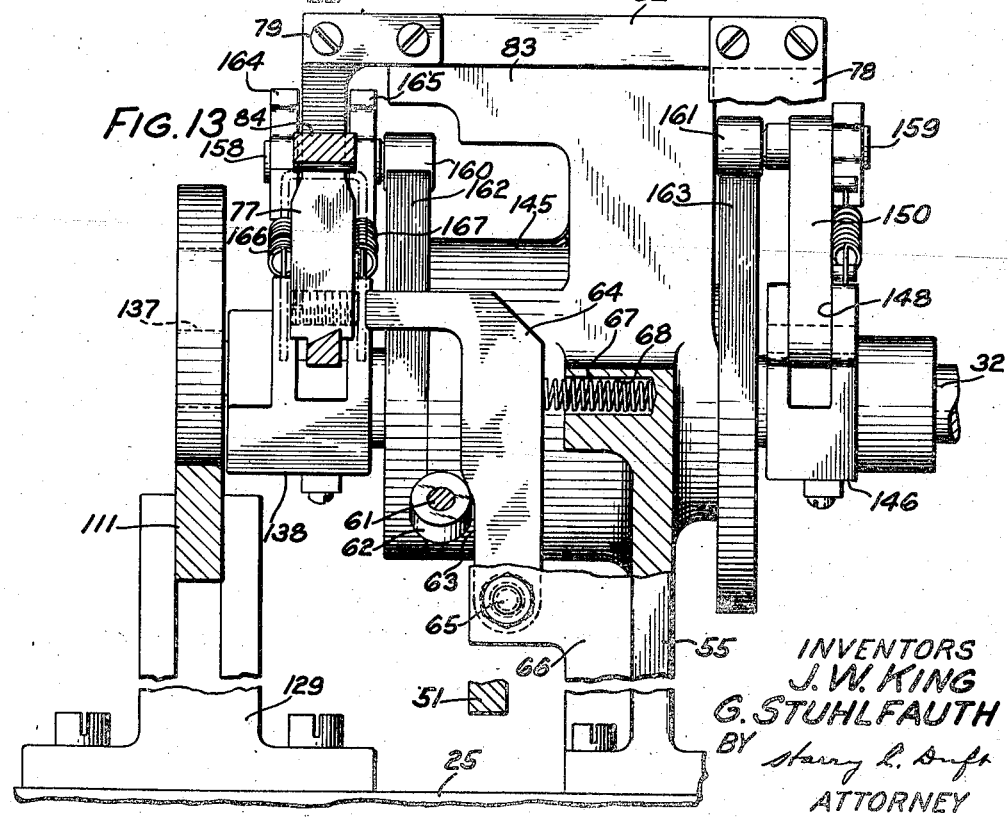

UNITED STATES PATENT OFFICE 2,404,180

BURR REMOVING APPARATUS

John W. King, Oak Park, and George Stuhlfauth, Chicago, Ill., assignors to Western Electric Company, Incorporated, New York, N. Y., a corporation of New York Application May 11, 1943, Serial No. 486,580

8 Claims. (Cl. 29—33)

This invention relates to burr removing apparatus and more particularly to an apparatus for removing the burrs resulting from broaching surfaces of an article.

In the manufacture of some articles, it is desired to form cooperating surfaces thereof to conform very accurately to a desired contour and, accordingly, these surfaces are formed by broaching operations. When broaching is performed, it quite frequently happens that burrs are thrown up by the broaching tool, which must be removed either by hand or by some machine designed for this purpose.

It is an object of the present invention to provide a simple and inexpensive apparatus for removing burrs from articles.

In accordance with one embodiment of the invention as applied to a telephone switching frame assembly which has had three of its surfaces surface-broached, mechanism is provided for simultaneously initiating the operation of clamping devices to clamp the frame in position and to initiate the operation of removing broaching burrs from edges of each of the three surfaces. In the particular embodiment of the invention chosen for illustration, the two side edges and an end edge of a surface, which has been formed to the desired dimension by a broaching operation, has the broaching burrs removed therefrom by cooperating cutting knives and files. The files which remove the burr from the end edges of the surfaces which have been broached are driven through a substantially circular path to finish the end edge to a high degree of accuracy, whereas the two opposed knives are driven in a straight line to cut the two side edges of two of three broached surfaces simultaneously.

A better understanding of the invention may be had by reference to the following detailed description when considered in conjunction with the accompanying drawings, wherein Fig. 1 is a view in perspective of a telephone crossbar switch vertical unit frame having three armature supporting legs which have been formed in a broaching operation, which legs are to be trimmed by means of the apparatus embodying the present invention;

Fig. 2 is a side elevational view, partly broken away, of an apparatus for broaching the surfaces of the frame shown in Fig. 1 and showing some details of the mechanisms for driving the cutting knives;

Fig. 3 is a detail view of one of the cutting knives showing diagrammatically the path of travel thereof in performing its operation;

Fig. 4 is a plan view of the apparatus shown in Fig. 1, parts being broken away to conserve space and showing diagrammatically the actuating mechanisms for the clamps which hold the frame during the removal of the burrs therefrom;

Figure 10:
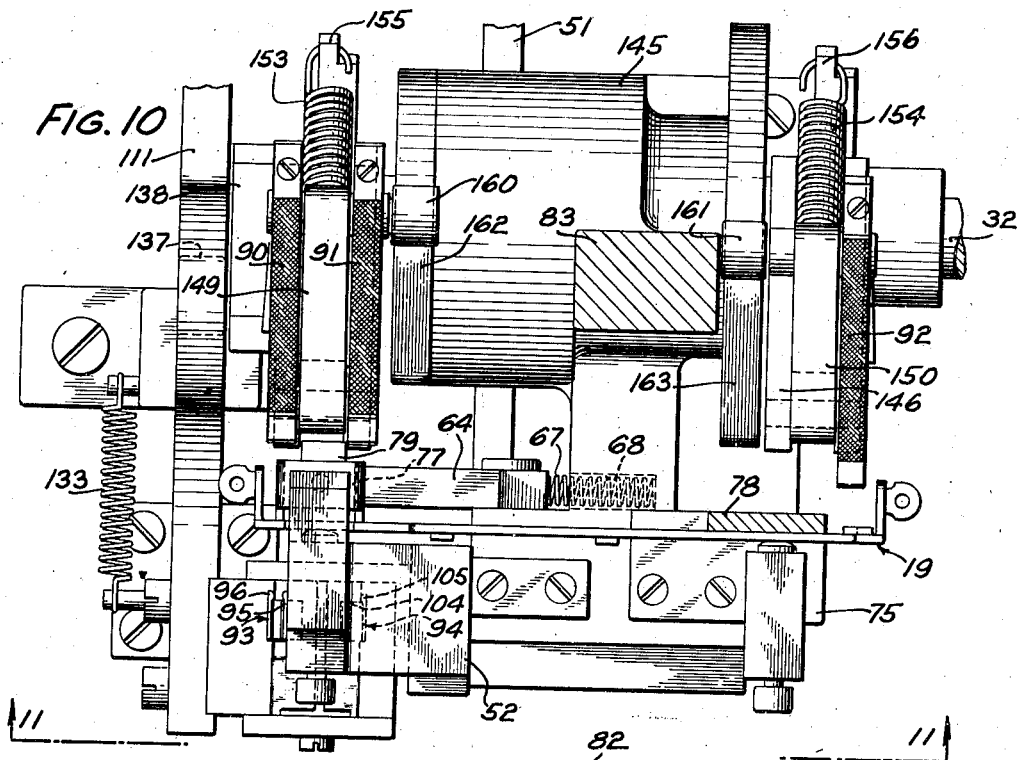
Figure 11:
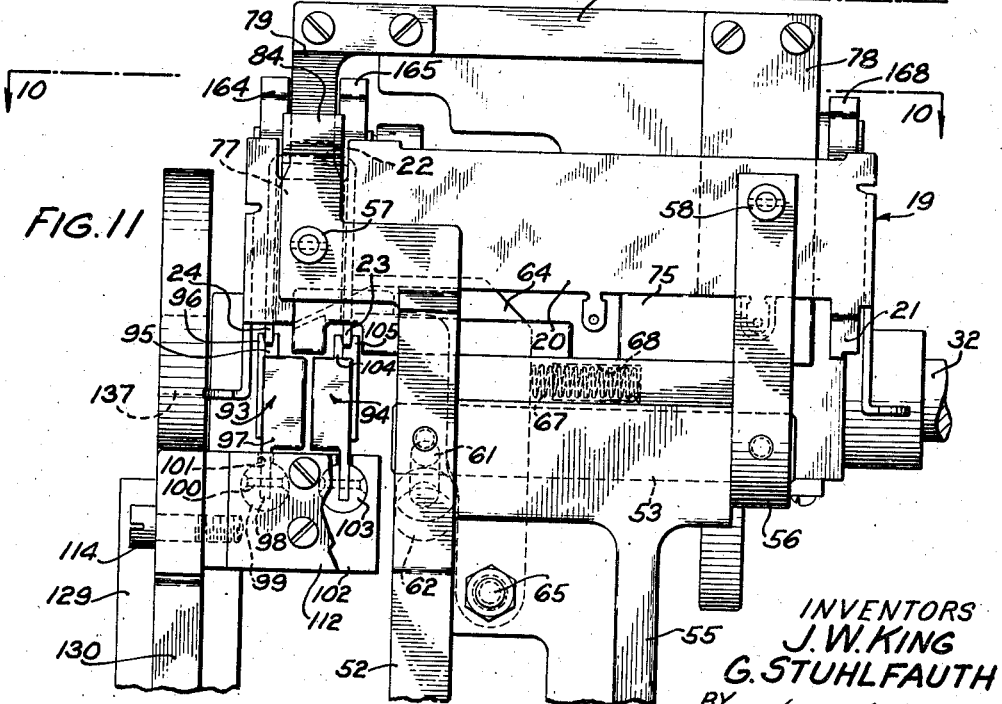

Figs. 5, 6 and 7 are fragmentary detail views of the cutting knives for removing the burrs from the side edges of portions of the frame shown in Fig. 1, Fig. 5 being a side elevational view of the knife and Figs. 6 and 7 comprising sectional views taken along the lines 6—6 and 7—7 of Fig. 5 in the direction of the arrows;

Figs. 8 and 9 are vertical sectional views on an enlarged scale taken substantially along the lines 8—8 and 9—9 of Fig. 4 in the direction of the arrows and showing details of the clamping mechanism and the driving means for the files;

Fig. 10 is a plan section taken substantially along the line 10—10 of Fig. 8 in the direction of the arrows;

Fig. 11 is a fragmentary front elevational view of the clamping mechanism for holding a frame in position in the apparatus and taken substantially along the line 11—11 of either Fig. 8 or Fig. 10;

Fig. 12 is a plan sectional view taken substantially along the line 12—12 of Fig. 8 in the direction of the arrows showing details of the drive mechanism for the knives and the files; and Fig. 13 is a vertical sectional view taken substantially along the line 13—13 of Fig. 8 in the direction of the arrows.

Referring to the drawings, wherein like reference characters designate the same parts throughout the several views, particular reference being had to Fig. 1 wherein a telephone crossbar switch vertical unit base assembly is shown at 19, it will be seen that the base assembly comprises a main frame member 20 having an armature supporting leg 21 formed integrally therewith. The main frame member 20 has an inverted U-shaped member 22 suitably attached thereto, for example, by welding, and this U-shaped member has depending leg portions 23 and 24. The leg 24 cooperates with the leg 21 to form the armature support of the switch and the leg 21, leg 24 and leg 23 are all cut accurately by a broaching operation to have their lower surfaces in the same plane. This results in throwing up a burr along the two side edges and one end edge of the legs 23 and 24 and also results in throwing up a burr at the front edge of the leg 21, as viewed in Fig. 1. Since the legs 21 and 24 serve as pivot points for the armature of the switch and the pivot rocks on the front edge of the legs, as shown in Fig. 1, it is necessary to remove these burrs from the legs 21 and 24. Since the leg 23 is formed in the same plane as the bottom surfaces of the legs 21 and 24, the leg 23 must also have the burrs removed from it.

The apparatus for removing the burrs from the legs of the switch frame assembly 19 is mounted upon a suitable base 25 and includes a driving shaft 26 continuously driven by a motor 27 (Fig. 4). The shaft 26 has a sprocket 28 mounted thereon for driving a chain 29, which, in turn, engages a sprocket 30 of a single revolution clutch 31 of any suitable type, which may be rendered operative to drive a shaft 32 through a single revolution each time a controlling handle 33 is depressed. The details of construction of the single revolution clutch 31, not forming an essential portion of the present invention, have not been shown in detail and it will be understood that any suitable single revolution clutch operable as described may be used in the apparatus. In addition to driving the shaft 32 through one cycle of rotation, the single revolution clutch 31, when rendered operative by manipulating the handle 33, also drives a cam 34 through a single revolution to operate a switch 35 for supplying power to energize either a coil 36 or a coil 37 forming a part of a solenoid operated switch having a shiftable core 38 which will be attracted by either the core 36 or 37, depending upon which of the coils has battery connected to it through the switch 35. The core 38, in its movement, will operate an actuating lever 39 of a valve 40. The switch 35, when the apparatus is in its normal inoperative position, normally supplies current to the coil 37 and fluid under pressure will be directed from a source (not shown) through a pipe 41, through the passages in the valve, to the front end of a cylinder 42. However, as soon as the clutch 31 becomes operative due to the operation of the handle 33, the switch 35 will disconnect power from the coil 37 and connect power to operate the coil 36, thereby moving the valve 40 to the opposite position to that shown to direct the fluid under pressure from the pipe 41 to the rear end of the cylinder 42 (Fig. 4).

A piston (not shown) in the cylinder 42 serves to drive a piston rod 50, which has pivotally connected to it a link 51 for driving a lever 52. The lever 52 is attached to a rocker shaft 53, by means of a set screw 54, and serves to rock the shaft 53 each time the link 51 is actuated. The shaft 53 is journalled in an irregularly shaped standard 55 and carries a lever 56 at its right end, as seen most clearly in Figs. 11 and 12. At their upper ends, the levers 52 and 56 carry clamping pins 57 and 58, which are slidable in shouldered apertures 59 and 60 (Figs. 8 and 9) and are urged toward the frame assembly 19 to clamp it when the shaft 53 is rocked counter-clockwise, as viewed in Fig. 8 or clockwise, as viewed in Fig. 9, as will be described more in detail hereinafter. The lever 52 has a stud shaft 61 fixed in it which carries a freely rotatable cam roller 62 (Figs. 8 and 13). The cam roller 62 engages a cam surface 63 formed on a lever 64, which is, in turn, mounted upon a pivot stud 65 attached to an extending portion 66 of the standard 55. The lever 63 is normally urged to rock counter-clockwise (Figs. 11 and 13) by a compression spring 67 seated in a pocket 68 (Fig. 13) in the standard 55. In other words, the lever 63 is normally urged to rock to the left to clamp against the leg 23 of the frame assembly 19 and hold it in position to be worked upon, but will be cammed out of clamping position when the lever 52 is rocked clockwise, as shown in Fig. 8, due to the cam roller 62 mounted on the lever 52 engaging the high portion of the cam surface 63 on the lever 64.

When a frame assembly 19 is to be operated upon, it may be placed, as shown most clearly in Figs. 10 and 11, with the lower edge of the main frame member 20 resting on a support block 75, which has a cut-out 76 formed in it for receiving a depending portion of the main framework 20. The left end (Figs. 10, 11 and 13) will be supported upon a support block 77, which fits into the U-shaped member 22. The lever 64 will clamp the leg 23 of the U-shaped member 22 against the side of the support block 77 and the clamping pins 57 and 58 will clamp the main frame member 20 against the front face of the support block 77 and an upwardly extending frame member 78 formed integrally with the support block 75. The support block 77 is also provided with an upwardly extending frame member 79, against the front surface of which the U-shaped member 22 will bear. The two frame members 78 and 79 are attached to legs 80 and 81, respectively, of a substantially U-shaped bracket 82, which is, in turn, mounted upon an upwardly extending portion 83 of the standard 55. In addition to being supported by the U-shaped member 82 at their upper ends, the support blocks 75 and 77 rest upon and are fixed to the portion of the standard 55 in which the rocker shaft 53 is journalled, as may be seen particularly by reference to Figs. 8 and 9. In addition to the clamping mechanisms just described, the lever 52 is provided with a rearwardly extending clamping projection 84, which, when the lever is moved to its operative position, as shown in Fig. 8, will engage the upper surface of the U-shaped member 22 to clamp it tightly in place on the upper surface of the support block 77, thus to hold the frame assembly 19 during the succeeding operations thereon.

By means of the clamping mechanism just described, a switch frame assembly 19 to have the burrs removed from it may be clamped in position to be worked upon by files 90, 91 and 92 and by cutting knife assemblies 93 and 94. The shaft 32, in its cycle of rotation, will operate the files 90, 91 and 92 and the cutting knife assemblies 93 and 94 in a fixed sequence starting from the normal inoperative position of the apparatus as shown in Fig. 2. The first operation performed on the frame 19 is effected by the cutting knives, as shown most clearly in Figs. 5, 6 and 7, where the cutting knife assembly 93 is shown. In this assembly, a pair of irregularly shaped knife blades 95 and 96 are mounted upon a block 97. The block 97, as shown most clearly in Fig. 11, is provided with a depending portion 98 riveted into a short rock shaft 99 by means of rivets 100 (Figs. 2 and 11). The depending portion 98 of the block 97 may rock to a limited extent in a slot 101 formed in a support block 102, which serves as a bearing for supporting the rock shaft 99. The cutting knife assembly 94 is similar in construction to the assembly 93, being supported on a rock shaft 103 and carrying back plates 104 and 105. The assemblies 93 and 94 are thus permitted to rock a short distance with respect to the support block 102 in order that they may properly align themselves with the legs 24 and 23, respectively, of the U-shaped member 22 on the frame assembly 19. The knife blade 96 is provided with a sharpened edge 106, which is positioned to the right (Figs. 5 and 7) of a guide projection 107. Similarly, the knife blade 95 is provided with a sharpened edge 108 positioned to the right of a guide projection 109. In the operation of the apparatus, the guide edges 107 and 109 will engage opposite sides of the leg 24 and will guide the knife blades 95 and 96 into engagement with the burrs formed in the previous broaching operation. Since the blades 95 and 96 may not be moved with respect to each other, but move as a unit, the guide projections 107 and 109 will guide the knife blades 95 and 96 into engagement with the edges of the leg 24 as the cutting knife assembly 93 is moved from left to right, as viewed in Fig. 5. The two knife blades 95 and 96 are held on the block 97 by means of a machine screw 110 and the supporting block 102 is fixed on the right end (Fig. 2) of a reciprocable lever 111. The rock shafts 99 and 103 are held in place in the block 102 by backing plates 112 and 113 (Figs. 2 and 11) suitably attached to the block 102 which is, in turn, fixed to the lever 111 by means of a pair of machine screws 114.

The reciprocable lever 111 is slidable in an oscillatable housing 121, which is pivoted on an upright 122—122, in turn mounted upon the base 25. The upward movement of the oscillatable housing 121 is limited by an abutment screw 123 threaded into a cross head 124 extending to the right (Fig. 4) of a standard 125, which is, in turn, suitably mounted on the base 25. The undersurface of the oscillatable housing 121 has a stud 126 set into it for retaining compression spring 127 in position to bear against the underside of the housing and urge the housing upwardly. A guide stud 128 extending from the base of the standard 125 serves to position the bottom end of the compression spring 127 and also cooperates with the stud 126 and abutment to prevent the housing 121 from oscillating beyond a predetermined point. Extending upwardly from the base plate 25 is a bifurcated guide standard 129, which engages the two side edges of the lever 111 to guide the front end thereof. An L-shaped lever 130, pivotally mounted on a pin 131, which is, in turn, mounted on a bracket 132, is normally urged to the position shown in Fig. 2 by a contractile spring 133 attached to the lever 130 and to the guide standard 129. The amount of movement of the lever 130 in a counter-clockwise direction about its pivot pin 131 is limited by an abutment screw 134, which strikes the base 25. The upper end of the lever 130 serves as a camming surface for engaging the undersurface of the lever 111, as seen most clearly in Fig. 2, to prevent the lever 111 from moving downwardly during a cutting operation of the knife blades 95 and 96 when the lever 111 is moved to the left, whereby the cutting knife assemblies 93 and 94 will travel in a straight line, as indicated by the line 135 (Fig. 3). The lever 111 is provided with a cam slot 136 (Fig. 3) for receiving a camming pin 137, which moves through a circular path to actuate the lever 111. As seen in Fig. 2, the camming pin 137 rotates counter-clockwise, being mounted upon a primary lever 138, which is, in turn, fixed to the shaft 32 by means of a set screw 139. The primary lever 138 being driven by the shaft 32 will carry the camming pin 137 through a circular path. In the first portion of its travel from the position shown in Fig. 2 in a counter-clockwise direction, the pin 137 will engage the left side of the cam slot 136 to slide the lever 111 to the left. Since the spring 127 holds the housing 121 up against the abutment screw 123, the lever 111 will travel in a straight line, as indicated by the course of the knife blade 96 in Fig. 3 at the line 135. However, as soon as the camming pin 137, in its circular path of travel, has passed beyond a horizontal position a short distance and after the cutting knife assemblies 93 and 94 have moved across the legs 23 and 24 of the frame assembly 19, the camming pin 137 will engage the bottom edge of the cam slot 136 and the lever 111 and housing 121 will be rocked clockwise about the pivot mounting for the housing 121 and the cutting knife assemblies 93 and 94 will then follow the path designated 140 (Fig. 3) for the knife blade 96. When the lever 111 is thus moved through the circular path, as indicated by the line 140, the forward end thereof will strike the left side (Fig. 2) of the lever 130 to rock it about its pivot pin 131 in a clockwise direction until the spring 127 forces the lower surface of the cam slot tightly against the camming pin 137 toward the end of its travel back to the position shown in Fig. 2, at which time the lever 130 will slip off the right end of the lever 111 and return to the position shown.

The shaft 32, as seen most clearly in Fig. 12, is journalled in a bearing 145 forming a part of the standard 55 and, in addition to the lever 138 mounted at its left end (Fig. 12), has a lever 146 mounted at its right end. Each of the levers 138 and 146 is forked, as shown at 147 and 148, respectively, for receiving levers 149 and 150, which are pivoted on the levers 138 and 146 by means of pins 151 and 152. The levers 149 and 150 are urged to rock with respect to the levers 138 and 146 in a direction toward the shaft 32 by springs 153 and 154, which are attached to the levers 149 and 150 intermediate their ends and are attached to brackets 155 and 156, respectively, which are, in turn, mounted by means of machine screws 157—157 on flattened surfaces of the levers 138 and 146. At their free ends, the levers 149 and 150 have stud shafts 158 and 159, respectively, mounted in them, which carry cam rollers 160 and 161, respectively, in engagement with stationary cams 162 and 163 fixed to opposite ends of the bearing portion 145 of the standard 55. In addition to rotatably supporting the cam roller 160, the stud shaft 158 rotatably supports a pair of levers 164 and 165, which are urged to rotate counter-clockwise on the stud shaft 158 (Fig. 8) by contractile springs 166 and 167 attached thereto and to the lever 149. Similarly, the stud shaft 159 pivotally supports a lever 168, which is urged to rotate clockwise with respect to the shaft 159 (Fig. 9) by a contractile spring 169. The levers 164, 165 and 168 are all of exactly the same construction and are each provided with a projecting portion 170, to which their respective springs are attached, and which engage pins 171 on their respective levers 149 and 150 to prevent movement of the levers 164, 165 and 167 beyond the position shown in Figs. 8 and 9. Each of the levers 164, 165 and 168 have a notch 174 formed in them at their free ends, as shown in Fig. 9, for receiving the files 90, 91 and 92, which are clamped in place in the notch 174 by a clamping plug 176 attached to each of the levers adjacent their hubs.

The cams 162 and 163, as will be apparent from Figs. 8 and 9, are of similar construction, the cam 163 being slightly larger than cam 162 since its associated cam roller 161 must direct the file 92 through a slightly different path than that through which the cam roller 160 guides the files 90 and 91.

A better understanding of the invention will be had by reference to the following brief description of the mode of operation thereof. A crossbar switch frame assembly 19, which is to have its legs 23, 24 and 21 treated to remove the broaching burrs from them, may be placed in the apparatus by dropping it into position where the base of the U-shaped frame 22 will engage the upper surface of the block 77 and where the lower edge of the frame 20 will engage the upper surface of the support block 75. The assembly 19 may be placed in this position with the rear edge of it engaging the face of the frame members 78 and 79 or may be dropped into position where the frame 20 will rest against the clamping pins 57 and 58 and the handle 33 may then be manipulated to cause the single revolution clutch 31 to interconnect the shaft 32 with the shaft 26. As the shaft 32 starts to rotate, the switch 35 will be operated to supply current to the coil 36, attracting the solenoid coil 38 and reversing the valve 40 from the position shown. When the valve 40 is reversed, fluid under pressure will be directed through the pipe 41 through the valve 40 to the upper or rear end (Fig. 4) of the cylinder 42. When fluid under pressure is supplied to the rear end of the cylinder 42, the piston rod 50 will be moved downwardly, as viewed in Fig. 4, or to the right, as viewed in Figs. 2 and 8, thereby to rock the lever 52 and rock shaft 53 counter-clockwise. As the lever 52 rocks counter-clockwise, the lever 56 will rock clockwise, as shown in Fig. 9, and the clamping pins 57 and 58 will thereupon clamp the frame assembly 19 against the front surfaces of the frame members 78 and 79. When the lever 52 reaches the end of its travel to clamping position, the clamping projection 84 will engage the upper surface of the U-shaped member 22 to clamp it against the upper surface of the support block 77 and while the lever 52 is moving to the position shown in Fig. 8, the cam roller 62 will roll down the face of the cam surface 63 on clamping lever 64, thereby shifting the frame assembly 19 to a proper position where the inner surface of the leg 23 will bear against the right hand side (Fig. 13) of the support block 77 just prior to the final clamping of the assembly 19 by the clamping projection 84. This operation of clamping the assembly in position to be worked upon will occur in the very first portion of the cycle of rotation of the shaft 32 and as soon as the part is clamped in place, the cutting knife assembles 93 and 94 will become effective due to the movement of the reciprocable lever 111 to the left under the action of the camming pin 137. As described hereinbefore, the cutting knife assemblies 93 and 94 will follow the path indicated by curved and straight lines 140 and 135 (Fig. 3) to, in the first half cycle of the shaft 32, cut off any burrs formed along the side edges of the legs 23 and 24. In performing this operation, the lever 111 will be prevented from tilting downwardly due to the engagement of the undersurface thereof with the top surface of the lever 130 and, therefore, the lever 111 will travel straight toward the rear of the machine in a substantially horizontal path. As soon as the cutting knife assemblies have cleared the legs 21, 23 and 24, the lever 111 and the knife assemblies will travel through an arc, as indicated by the line 140, the lower right end (Fig. 2) of the lever 111 having passed off the upper surface of the lever 130, will then engage the lever 130 and rock it clockwise about the pin 131 until the camming pin 137 ceases to effect a downward thrust on the lever 111, at which time the spring 127 will start to push the lever back up to the position shown in Fig. 2.

During the second half cycle of the shaft 32, the filing portion of the apparatus will become effective to file the broaching burrs off the legs 21, 23 and 24, at which time the files 90, 91 and 92 will start from the position shown in Figs. 8 and 9, which is the position they occupy in approximately the last quarter of cycle of rotation of the shaft 32. The files will be urged to retain the angular position shown in Figs. 8 and 9 as they travel upwardly, but, of course, they will be rocked about the stud shafts 158 and 159 due to their engagement with the legs 21, 23 and 24, and they will thus very slightly round off the corners of the legs and remove any burrs which might have been formed thereon. As soon as the stud shafts 158 and 159 being guided by their respective cam rollers 160 and 161 reach the top of the vertical portion of the cams 162 and 163, they will start to move away from the frame assembly 19 clamped in the apparatus and as the shaft 32 completes its cycle of operation, will assume the angular position shown in Fig. 2.

What is claimed is:

1. A burr removing apparatus comprising a clamping means for holding an article, a knife for cutting burrs from one portion of the article, a file for filing burrs from another portion of the article, a cam and crank shaft rotatable through a single cycle to cause operation of the clamping means, the knife and the file, means on the cam and crank shaft for imparting movement to the knife, and means cooperating with the means on the cam and crank shaft to guide the knife in a rectilinear path and in an arcuate path.

2. A burr removing apparatus comprising a clamping means for holding an article, a knife for cutting burrs from one portion of the article, a file for filing burrs from another portion of the article, a cam and crank shaft rotatable through a single cycle to cause operation of the clamping means, the knife and the file, means on the cam and crank shaft for carrying the files through a rotary path, and a stationary cam surrounding the shaft for guiding the file.

3. A burr removing apparatus comprising a clamping means for holding an article, a knife for cutting burrs from one portion of the article, a file for filing burrs from another portion of the article, a cam and crank shaft rotatable through a single cycle to cause operation of the clamping means, the knife and the file, means on the cam and crank shaft for carrying the files through a rotary path, a stationary cam surrounding the shaft for guiding the file, and means tending to hold the file at a predetermined angle to the article.

4. A burr removing apparatus comprising a clamping means for holding an article, a knife for cutting burrs from one portion of the article, a file for filing burrs from another portion of the article, a cam and crank shaft rotatable through a single cycle to cause operation of the clamping means, the knife and the file, and means mounted on the cam and crank shaft for resiliently supporting the file with respect to the cam and crank shaft.

5. A burr removing apparatus comprising a clamping means for holding an article, a knife for cutting burrs from one portion of the article, a file for filing burrs from another portion of the article, a cam and crank shaft rotatable through a single cycle to cause operation of the clamping means, the knife and the file, means mounted on the cam shaft for resiliently supporting the file with respect to the shaft, and a cam encircling the cam shaft for deflecting the knife eccentrically of the shaft.

6. In a burr removing apparatus, a camming pin movable in a circular path, a slidable and oscillatable lever driven by said pin, burr removing means carried by said lever, and means for guiding said lever in a straight line during part of the movement of the camming pin, said means being movable by the lever during another part of the movement of the pin to guide the lever during its movement in a substantially semi-circular path.

7. In a burr removing apparatus, a camming pin movable in a circular path, a slidable and oscillatable lever driven by said pin, burr removing means carried by said lever, camming surfaces formed on said lever for engagement by the pin, and means for guiding said lever in a straight line during part of the movement of the camming pin, said means being movable by the lever during another part of the movement of the pin to guide the lever during its movement in a semi-circular path.

8. In a burr removing apparatus, a camming pin movable through a circular path, a slidable and oscillatable lever having camming surfaces for engagement by said pin, means for urging said lever to follow a predetermined straight path and compressible by said lever during a portion of its travel under the action of the pin to guide an end of the lever in a semi-circular path, and burr removing knives carried by said lever.

JOHN W. KING.
GEORGE STUHLFAUTH.